United States Patent
Shaw (10) Patent No.: US 12,524,260 B2
(45) Date of Patent: Jan. 13, 2026

(54) MEASUREMENTS OF VIRTUAL MACHINES

(71) Applicant: Hewlett-Packard Development Company, L.P., Spring, TX (US)

(72) Inventor: Adrian Shaw, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 548 days.

(21) Appl. No.: 18/176,220

(22) Filed: Feb. 28, 2023

(65) Prior Publication Data
US 2024/0289155 A1 Aug. 29, 2024

(51) Int. Cl.
*G06F 9/455* (2018.01)
*G06F 21/57* (2013.01)

(52) U.S. Cl.
CPC ........ *G06F 9/45558* (2013.01); *G06F 21/575* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,127,146 B2 | 2/2012 | Thom et al. | |
| 8,132,003 B2 | 3/2012 | Durham et al. | |
| 10,706,152 B2 * | 7/2020 | Suryanarayana | G06F 9/45558 |
| 11,029,967 B2 | 6/2021 | Callaghan et al. | |
| 2010/0082987 A1 * | 4/2010 | Thom | G06F 21/34 |
| | | | 713/171 |
| 2014/0025961 A1 * | 1/2014 | Mackintosh | G06F 21/577 |
| | | | 713/189 |
| 2014/0208123 A1 * | 7/2014 | Roth | G06F 21/575 |
| | | | 713/189 |
| 2015/0261978 A1 * | 9/2015 | Scarlata | H04L 63/0428 |
| | | | 713/189 |
| 2019/0394241 A1 * | 12/2019 | Fenner | G06F 21/575 |
| 2020/0285483 A1 | 9/2020 | Callaghan et al. | |
| 2021/0049263 A1 | 2/2021 | Kiperberg et al. | |
| 2022/0391512 A1 * | 12/2022 | Sethi | G06F 21/575 |
| 2023/0051347 A1 * | 2/2023 | Sakib | G06F 9/45558 |

* cited by examiner

Primary Examiner — Mustafa A Amin
(74) Attorney, Agent, or Firm — Quarles & Brady LLP (57) ABSTRACT

A security verification system may acquire first authorization information, wherein the first authorization information defines an access right to store data in a trusted platform module (TPM) of the computing device. A system may generate an index of an allocated memory location of the TPM and second authorization information using the first authorization information, wherein the second authorization information defines an access right associated with the index. A system may receive a request from a hypervisor to initiate a virtual machine. A system may transmit the second authorization information to the hypervisor. A system may store an initial state of the virtual machine at the index using the second authorization information.

20 Claims, 6 Drawing Sheets

MEASUREMENTS OF VIRTUAL MACHINES

BACKGROUND

Virtual machines have routinely been used to allow for securely and privately processing sensitive information on a computing device. In some implementations, a virtual machine is initiated on a host system physically or logically separated from the user of the virtual machine. For example, a portion of computing resources of a server may be rented or purchased for processing data, and a virtual machine may be initiated to utilize these server computing resources.

BRIEF DESCRIPTION OF THE DRAWINGS

Examples of various features of the present disclosure are now described with reference to the following drawings. Throughout the drawings, reference numbers may be re-used to indicate correspondence between referenced elements. The drawings are provided to show examples described herein and are not intended to limit the scope of the disclosure.

DETAILED DESCRIPTION

The present disclosure relates to the allocation and management of secured memory, such as in a trusted platform module (TPM), in a hardware layer of a computing device for verifying the security of virtual machine instances operating on the computing device. The secured memory is used to manage access to, and provide secure storage for, information characterizing aspects of instantiated virtual machine instances operating on the computing device. Characterizing the virtual machine instances may correspond to a measurement of virtual machine characteristics or attributes stored in the secured memory at the time of instantiation. The measurement of the characteristics or attributes can then be provided to external services to validate security aspects of the instantiated virtual machine instances.

Some systems have allowed for the initiation of a private virtual machine (PVM) on a host system, such as a shared server, in which data of the PVM is separate and inaccessible to both the host system and any other virtual machine instances running on the host system. In many cases, a remote verifier desires to determine whether the PVM was correctly initiated by the host system and whether information being transmitted to and from the PVM is in fact secure and inaccessible to the underlying host system.

In one example, an application developer rents computing services from a cloud hosting provider to run a PVM instance. The application developer processes application user data on the PVM instantiated on the cloud hosted computing service and expects the user data to remain inaccessible to the host computing device and any other users of the host computing device (e.g., other developers renting compute time on the same service). However, the application developer does not want to trust that the host computing device is secure without the ability to verify that the host computing device has not been altered or affected by, for example, malware. Therefore, the application developer has an interest in being able to communicate with both the host computing device and the PVM in order to determine the security of the host computing device and the proper initiation of the private virtual machine.

However, continuing with the prior example, the host computing device may implement a system whereby secured memory of the host computing device, such as in a TPM of the host computing device, is used to store information about the PVM. The boot instructions of the host computing device may be updated to use platform hierarchy authorization information (e.g., an authorization secret of the platform hierarchy) of the host computing device to record information about the PVM in secured memory. The operating system of the host computing device does not have access to the platform hierarchy authorization information, and therefore may not write or alter the stored information related to the PVM. The information about the PVM stored in the TPM may then be accessed by the application developer, allowing the application developer to verify that the host computing device has not tampered with the PVM at any point from instantiation to the time a request to the TPM for information about the PVM (e.g., a measurement) is made.

The present disclosure is described with regard to certain examples, which are not intended to limit the disclosure. Although aspects of some examples described in the disclosure focus on particular examples of hardware components, network structures, software components, system boot orders, and the like, the examples are not intended to be limiting. In some examples, the techniques described herein may be applied to additional or alternative types of hardware configurations, software configurations, computing system security arrangements, and the like. Additionally, any feature used in any example described herein may be used in any combination with any other feature or in any other example, without limitation.

Figure 1A:
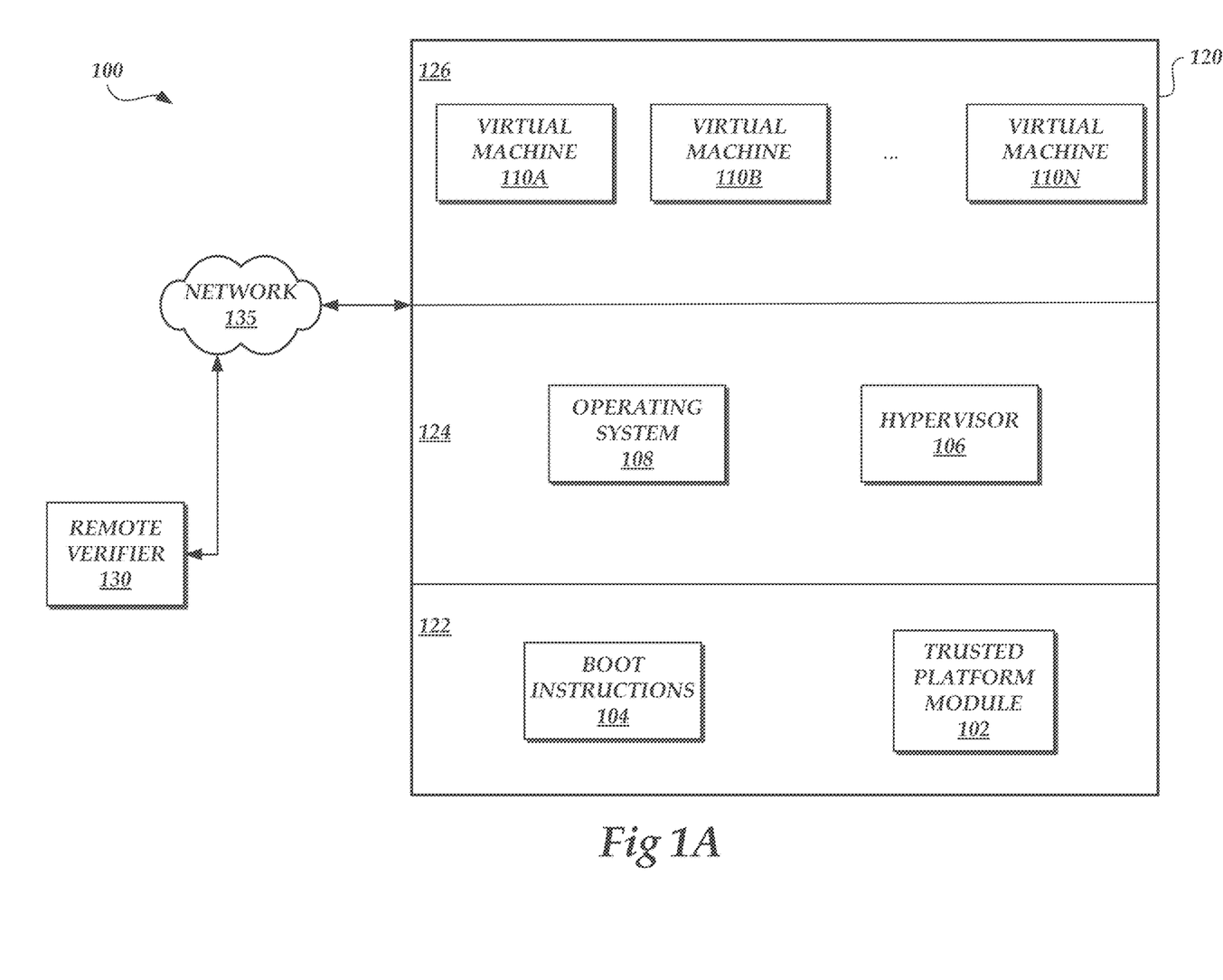
FIG. 1A is an example block diagram of a security verification system having a host system in communication with a remote verifier via a network.

FIG. 1A shows an example block diagram of a security verification system 100. As described above, the security verification system 100 includes a host system 120 that includes secured memory resources in a platform layer 122. The secured memory resources can, for example, be implemented in a manner such that access to the secured memory resources in general can be controlled in accordance with access control information (e.g., first access information). Additionally, in some examples, specific memory locations within the secured memory resources can be further controlled with additional memory access information (e.g., second access information).

The host system 120 may be a computing device, such as a personal computing device, a server, a laptop computing device, or a tablet computing device, configured to communicate over a network 135. The host system 120 is configured such that a virtual machine 110A may be instantiated and then operate on the host system 120. In some examples, the host system 120 can further implement allocation and management controls for the secured memory to manage access characterizing aspects of instantiated virtual machine instances on the computing device. For example, the characterization of the virtual machine instances can correspond to a measurement of characteristics or attributes of virtual machine instances at the time of instantiation. The measurement of the characteristics or attributes can then be requested by or provided to external services (e.g., a remote verifier 130) to validate security aspects of the instantiated virtual machine instances. Specifically, the measurement of the characteristics or attributes can be utilized by third-party services (e.g., network services) to determine whether a virtual machine 110A has been securely initiated by a host system 120.

As further described below, the security verification system 100 includes the host system 120 in communication with a remote verifier 130 via a network 135. Communication between the remote verifier 130 and the host system 120 via the network 135 allows the remote verifier 130 to request information related to the virtual machine 110A from the trusted platform module 102 so that the remote verifier 130 may verify the secure operation of the virtual machine 110A. In an example, the host system 120 can be organized as having a plurality of logical layers, each of which may be associated with different access logic and access credentials. For purposes of an example, the host system 120 shown in FIG. 1A can be depicted in accordance with a three-tiered logical layer example. As also further described below, the host system 120 includes a first layer, generally referred to as a platform layer 122 having boot instructions 104 and a trusted platform module 102. The platform layer 122 may generally be implemented as a hardware layer that is initialized first during the power up or boot cycle of the host system 120. The host system 120 also includes a second layer, generally referred to as a system layer 124 having a hypervisor 106 and an operating system 108. The system layer 124 may generally be implemented as a software layer that operates over the platform layer 122 and is instantiated after the components of the platform layer 122 have completed initialization. Alternatively, the hypervisor 106 may operate in a separate hypervisor layer between the platform layer 122 and the system layer 124. Alternatively, the hypervisor may operate on a privileged platform component, the privileged platform component being part of the platform layer 122. The host system 120 also includes a virtual machine layer 126 having a virtual machine 110A or a plurality of virtual machines 110A-110N. The virtual machine layer 126 may be implemented as a software layer that is initialized by a component of the platform layer 122 or system layer 124. The virtual machine layer 126 may be initialized after the components of both the system layer 124 and platform layer 122 have completed initialization, such as where the virtual machine layer 126 requires resources of the operating system 108, the hypervisor 106, and trusted platform module 102 to operate securely.

Each logical layer of the host system 120, and the components associated therewith, are provided differing access control rights (e.g., read or write access) and access control information (e.g., cryptographic key values) to components of the host system 120. The access control information and access control rights available to a logical layer may be assigned based on the expected functionality of the components of that logical layer. For example, in the interest of security or privacy, the operating system 108 operating in the system layer 124 is not provided the access control information required to access some or all of the data of the virtual machine 110A operating in the virtual machine layer 126. Additionally, the hypervisor 106 operating in the system layer 124 initiates the virtual machine 110A without altering the contents of the virtual machine 110A, and may have access control information necessary to access some or all of the data of the virtual machine 110A after the virtual machine 110A has been initiated.

For example, a software developer operating a computing system (e.g., remote verifier 130) may intend to operate a virtual machine 110A on the host system 120 (e.g., because the processing resources available on the host system 120 exceed those of the remote verifier 130 computing system). The software developer may transmit, via a network 135, to the host system 120 instructions to initialize the virtual machine 110A. When the software developer transmits the instruction to initialize the virtual machine 110A, the software developer may not have access rights to the host system 120 sufficient to verify the security of the host system 120 (e.g., determining that the operating system 108 has not been compromised). Therefore, the software developer is unable to trust that the virtual machine 110A running on the host system 120 is secure, because the software developer is unable to trust the security of the underlying operating system 108 and host system 120. Using the security verification system 100, a measurement of the virtual machine 110A at initiation has been stored in a memory location of the trusted platform module 102 by the boot instructions 104 or hypervisor 106, such that the operating system 108 and other components of the host system 120 (e.g., a second virtual machine 110B) cannot alter or write to the memory location. The measurement may be a cryptographic hash value representing the initial state of the virtual machine 110A at a point prior to or during instantiation. In order to ensure secure operation of the virtual machine 110A, the software developer operating the remote verifier 130 may then, according to this example, transmit a request for information about the virtual machine 110A, via the network 135 to the host system 120. The request will then return the measurement of the virtual machine 110A stored in the secured memory location of the trusted platform module 102 to the remote verifier 130. The measurement may then be compared to an expected value by the remote verifier 130 to determine whether the virtual machine 110A has been tampered with prior to, or during, the initialization process.

The measurement of the virtual machine 110A in the trusted platform module 102 may then be accessed by the remote verifier 130 and may be compared to a known or expected value. When the measurement value in the trusted platform module 102 is equal to the value known or expected by the remote verifier 130, the remote verifier 130 may then know that the virtual machine 110A has not been altered by the operating system 108 or any other component of the host system 120 prior to or during initiation. The virtual machine 110A may then be trusted by the remote verifier 130. The remote verifier 130 may additionally choose to make periodic checks of a measurement of the virtual machine 110A added to the trusted platform module 102 during functioning of the virtual machine 110A to assess the continued security of the virtual machine 110A.

The host system 120 includes a trusted platform module 102, which securely stores information related to the host system 120 and applications, including the virtual machine 110A, running on the host system 120. The components of the trusted platform module 102 are discussed below in relation to FIG. 1B. The host system 120 further includes boot instructions 104. The boot instructions 104 contain instructions to initiate the software elements of the host system 120, including the operating system 108 and hypervisor 106. The hypervisor 106 is a component responsible for initiation, management, and termination of virtual machine instances on the host system 120, such as virtual machine 110A. The operating system 108 is an operating system (e.g., Microsoft Windows, Apple OSX, Linux, etc.) running on the host system. The operating system 108 may be in control of various components of the host system 120 and may have access to the trusted platform module 102.

The host system 120 is in communication with a remote verifier 130, for example, via a network 135. The remote verifier 130 operates to request information about the virtual machine 110A from the trusted platform module 102 for the purpose of verifying the virtual machine 110A has not been tampered with by the operating system 108. Additionally, the remote verifier 130 may request information related to the virtual machine 110A from the trusted platform module 102 to ensure that another component of the host system 120 is not pretending to communicate as the virtual machine 110A. As used herein, the remote verifier 130 may refer to any component or set of components in communication with the host system 120 and the virtual machine 110A instantiated therein. The remote verifier 130 may have an interest in the privacy or security of the virtual machine 110A, such as the isolation of data processed by the virtual machine 110A from the underlying operating system 108 of the host system 120 or another virtual machine operating on the host system 120 (e.g., virtual machine 110B).

The remote verifier 130 need not be a separate entity, component, or system from the host system 120, and may run in part or in its entirety on the same hardware components as the virtual machine 110A. For example, the remote verifier 130 may be an entity which has initiated the virtual machine 110A on the host system 120 in order to run a secure application, wherein the data of the secure application is controlled and managed by the virtual machine 110A separately from the operating system 108 of the host system 120. The secure application may manage or process sensitive information which the operating system 108 cannot be trusted to access, possibly due to a lack of trust in the security of the host system 120.

That is, a user or component of the host system 120 may be a remote verifier 130 even though the remote verifier 130 is operating on the same physical hardware or on some of the same components as the host system 120 on which the virtual machine 110A is running. For example, a user of the host system 120 may wish to operate on sensitive client data in a secure environment, but may not be able to verify the security of the operating system 108. Therefore, a virtual machine 110A may be initiated on the host system 120 to store the sensitive customer data and perform operations on the data. The virtual machine 110A may then transmit some or all of the resulting information to the remote verifier 130 on the host system 120.

The network 135 operates to allow the remote verifier 130 to communicate with the host system 120, specifically the virtual machine 110A and the trusted platform module 102. The network 135 may be the internet, an intranet, a direct connection between two computing devices, or any other system enabling communication between two components of the same computing device or two distinct computing devices. Alternatively, in the case where the remote verifier 130 is also operating on the host system 120, the network 135 may be internal to the host system 120 and facilitate communication between the components of the remote verifier 130 operating on the host system 120 and the virtual machine 110A.

In some examples, and as introduced above, the host system 120 may be logically divided into multiple layers comprising various components of the host system 120. Components in a same layer (e.g., the trusted platform module 102 and boot instructions 104 of the platform layer 122) may have the same or similar access control information of the host system 120 (e.g., the boot instructions 104 and trusted platform module 102 may have access to a cryptographic key of the trusted platform module 102 not accessible outside the platform layer 122). In one example, the platform layer 122 is implemented at the hardware level of the host system 120 and has the most access to access control information of the host system 120 (e.g., the platform layer 122 may access cryptographic keys of the host system 120 not available to components in other layers of the host system 120). The platform layer 122 may be configured such that the components, or data controlled by components, of the platform layer 122, are configurable with the use of a cryptographic key accessible only to components of the platform layer 122. The cryptographic key may not be accessible to components outside the platform layer 122 or may only be accessed by such components outside the platform layer 122 by communicating with a component of the platform layer 122 which manages control of the cryptographic key (e.g., the hypervisor 106 of the system layer 124 may not access the cryptographic key needed to extend the value stored at a memory location of the trusted platform module 102 directly, but may receive access control information from, for example, the boot instructions 104 sufficient to extend the value stored at the memory location of the trusted platform module 102). The boot instructions 104 and the trusted platform module 102 may be included within the platform layer 122 and contain elements with access controls implemented by the OEM. Components of the platform layer 122 may be, in part, reconfigurable. For example, a component or computing device with correct access rights may update the boot instructions 104.

The system layer 124 may comprise a hypervisor implemented on a separate or shared component of the host system 120. The components of the system layer 124 may be initiated during the boot sequence of the host system 120 by, for example, the boot instructions 104. In some examples, the system layer 124 will not begin initiating components, such as the hypervisor 106, until instructed to by the boot instructions 104. In other examples, another component of the platform layer 122 will initiate the hypervisor 106 of the system layer 124. In other examples, another component of the system layer 124 (e.g., the operating system 108) may initiate the hypervisor 106. As noted above, the hypervisor 106 may alternatively be implemented within a distinct logical layer located between the platform layer 122 and the system layer 124. Alternatively, the hypervisor 106 may be implemented within a module of the platform layer 122, such as a privileged platform component or hypervisor controller.

The system layer 124 may further comprise an operating system 108 (e.g., Microsoft Windows, Apple Mac OSX, Linux, etc.) to run on the host system 120. In some examples, components of the system layer 124 may not be initiated until components of the platform layer 122 have been initiated or completed a boot sequence. For example, the boot instructions 104 may comprise instructions to initiate the operating system 108 after a POST sequence has been completed. In some examples, the components of the system layer 124 may be initialized concurrently (e.g., the operating system 108 and hypervisor 106 may be initialized by the boot instructions 104 at the same point in the startup sequence of the host system 120). In other examples, components of the system layer 124 may be initiated at differing times, such as the hypervisor 106 being initiated prior to the initiation of the operating system 108. In additional examples, the order of initiation may be reversed, and the operating system 108 may be loaded into a memory of the host system 120 before the component storing the hypervisor 106 is provided instructions to begin operation.

The virtual machine layer 126 may comprise a set of virtual machines 110A-110N. The virtual machine layer may have access rights to components of the host system 120 distinct from access rights of the platform layer 122 or system layer 124. In some examples, the access rights of components of the virtual machine layer 126 will be more limited than the access rights of the system layer 124. In other examples, the access rights of components of the virtual machine layer 126 will differ from the access rights of components of the system layer 124, but the access rights of both layers will be as broad (e.g., components of the virtual machine layer 126 may have write access to one set of memory locations of the trusted platform module 102 and components of the system layer 124 will have access rights to a second, different, set of memory locations of the trusted platform module 102). In some examples, the components of the virtual machine layer 126 may not be initiated until the components of each other layer of the host system 120 has been initiated (e.g., after the platform layer 122, and system layer 124 have been initiated). In other configurations, the components of the virtual machine layer 126 may be initiated concurrently with the components of another layer of the host system 120, such as the operating system 108 of the system layer 124.

Figure 1B:
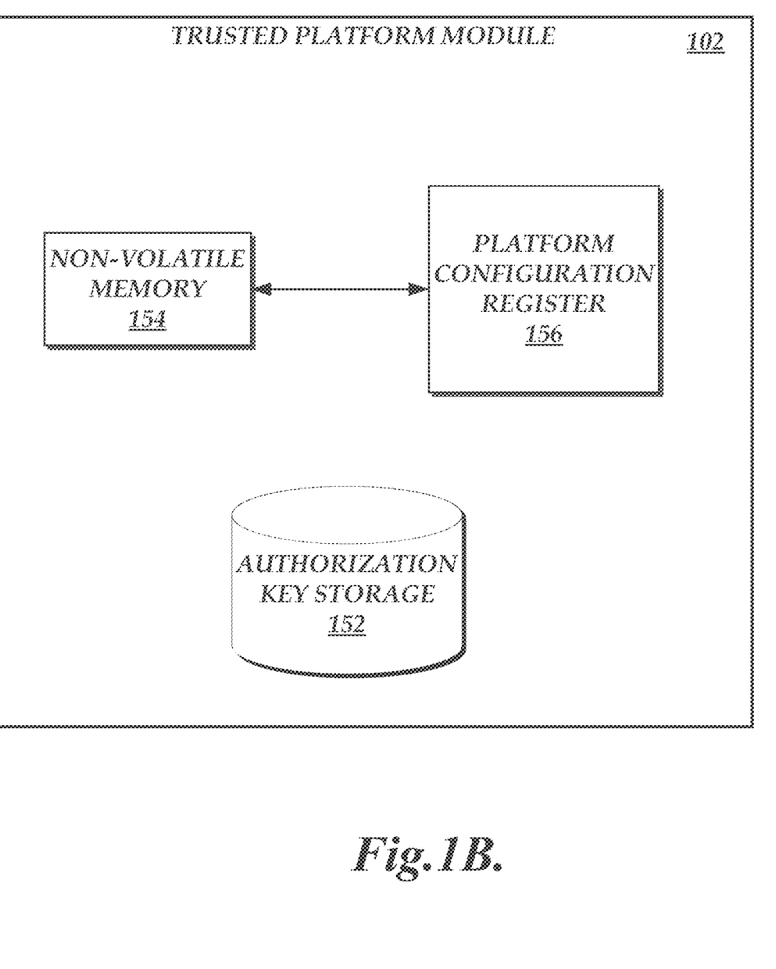
FIG. 1B is an example block diagram a trusted platform module of the host system of FIG. 1A.

Turning to FIG. 1B, the trusted platform module 102, in one example, includes a non-volatile memory 154, a platform configuration register 156, and an authorization key storage 152. The non-volatile memory 154 may be used to store measurements of the virtual machine 110A running on the host system 120. The non-volatile memory 154 may be provisioned, for example, by the boot instructions 104 to reserve a portion of the non-volatile memory 154 for use by the hypervisor 106, the virtual machine 110A, or the remote verifier 130. The non-volatile memory 154 may have a setting controlling, for example, the format of the measurement (e.g., the result of applying SHA-1, SHA-2, SHA-256, SHA-512, MD5, MD6, PMAC, NTLM, LANMAN, CRC-64, BSD checksum, etc. to the virtual machine 110A to be measured) allowed to be stored in the non-volatile memory 154. The setting may be pre-determined prior to boot of the host system 120, assigned during boot by the boot instructions 104, assigned by the hypervisor 106, or assigned by another component of the host system 120 intending to utilize the non-volatile memory 154 for storage of secure information in the trusted platform module 102.

In some examples, the platform configuration register 156 is a memory location of the trusted platform module 102 with properties which may differ from the properties of the non-volatile memory 154. For example, the platform configuration register 156 may accept information equal to the length of the output generated by an associated hash function (e.g., 20 bytes where the SHA-1 hash function is associated with the platform configuration register 156), and otherwise exclude information of an incorrect length. The associated hash function may be determined by the manufacturer of the host system 120 or the trusted platform module 102 and may not be alterable by any component of the host system 120 after manufacture. The platform configuration register 156 may be used in some examples within the security verification system 100 to record, such as in an event log, a location in the non-volatile memory 154 where a measurement of the virtual machine 110A is stored. The event log of the platform configuration register 156 may also be used to record index attributes.

Alternatively, any value stored in the platform configuration register 156 may be extended to include index attributes. A remote verifier 130 may then securely receive the location in the non-volatile memory 154 where a measurement of the virtual machine 110A is stored by reading the event log stored in the platform configuration register 156. The event log of the platform configuration register 156 may include measurements of other components of the host system 120, such as measurements of the operating system. The remote verifier 130 may read the entire event log stored in a platform configuration register 156, even where the event log has not been extended to include information about the index, to determine a security status of the host system 120.

In this example, the authorization key storage 152 is a component of the trusted platform module 102 storing authorization keys associated with the trusted platform module 102. The keys of the authorization key storage 152 may, for example, control access to the trusted platform module 102, control the ability to store information in the trusted platform module 102, control the ability to provision resources of the trusted platform module 102, control the ability to read from the trusted platform module 102, or control the ability to alter a value stored in the trusted platform module 102.

In some configurations, the authorization key storage holds public and private keys used for encryption of information in the trusted platform module 102 or for communication with the trusted platform module 102. A private key value stored in the authorization key storage 152 may be stored by the manufacturer of the trusted platform module 102 such that the private key value is not accessible to a user or component of the host system 120 in which the trusted platform module 102 is included. In other configurations, a private key may be stored by a component of the host system 120 in the authorization key storage 152, and that private key may then become inaccessible to components other than the trusted platform module 102. In other configurations, the trusted platform module 102 may generate a private key to be stored in the authorization key storage 152. Such a private key generated by the trusted platform module 102 may be based on another stored value within the trusted platform module 102.

In some configurations, the authorization key storage 152 may store an attestation identity key (AIK) or an endorsement key (EK) of the trusted platform module 102. The EK may be used by the trusted platform module 102 in communication with, for example, the remote verifier 130 to prove that the remote verifier 130 is in communication with the trusted platform module 102 and not a hardware or software component of the host system 120 attempting to imitate the trusted platform module 102. The EK may be set by the manufacturer and the private key value of the EK may not be revealed to the operating system 108, or any other component of the host system 120. The private portion of the AIK may not be revealed or shared outside the trusted platform module 102. The AIK may further be used only for a limited set of operations within the trusted platform module 102, such as signing the output of the trusted platform module 102 including a cryptographic digest of the contents of the non-volatile memory 154 or the platform configuration register 156. The AIK may be associated with the EK such that, for example, a remote verifier 130 may know that the trusted platform module 102 that the remote verifier 130 has confirmed communication with via the EK is also the trusted platform module 102 signing information with the AIK.

In some configurations, access rights to various components of the trusted platform module 102 may be controlled by an access hierarchy. The trusted platform module 102 access hierarchy may comprise a platform hierarchy, an endorsement hierarchy, and a storage hierarchy. A separate authorization secret may be required to create or delete information from a component where access rights are within one of the access hierarchies. The authorization secret, or key, may be stored in the authorization key storage 152. The platform hierarchy may be implemented in firmware of the trusted platform module 102, and the authorization secret may be determined by the OEM. The endorsement hierarchy may be used to provision resources of the trusted platform module 102. The storage hierarchy may be used for general key storage in the authorization key storage 152 and the generation of a cryptographic digest of application data intended to be secured. In some examples herein, the boot instructions 104 of the host system 120 may interact with the trusted platform module 102 on the level of the platform hierarchy. Other components of the host system 120 in logical layers of the host system 120 outside the platform layer 122 (e.g., the system layer 124, virtual machine layer 126, or the virtual machine layer 126) may be unable to alter operations performed in the trusted platform module 102 by the boot instructions 104. Components in the system layer 124, virtual machine layer 126, or virtual machine layer 126 may be limited to interacting with the trusted platform module 102 at the level of the endorsement hierarchy or the storage hierarchy.

Figure 2:
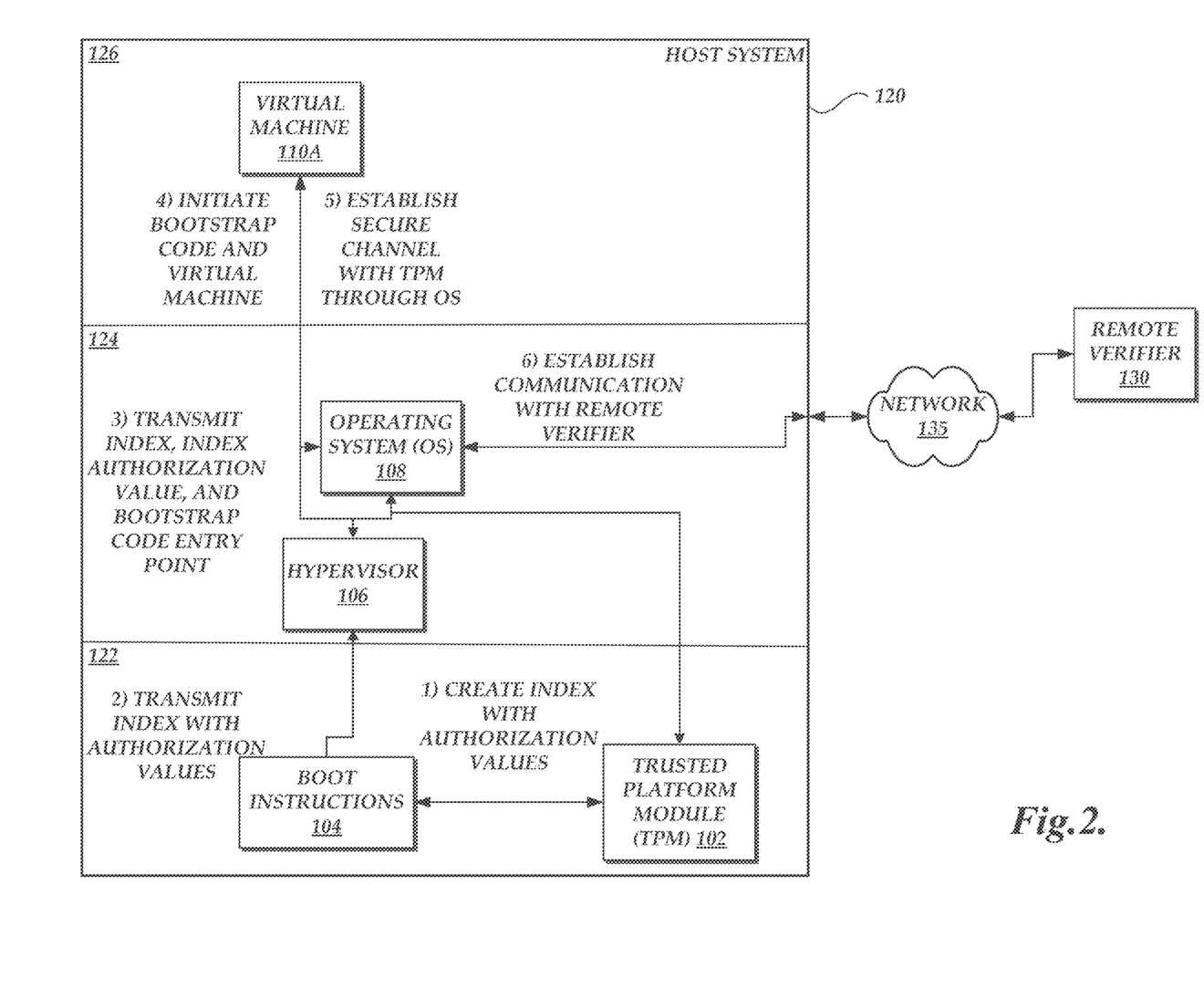
FIG. 2 is an example block flow diagram of data flows and interactions between components of the host system and the remote verifier of FIG. 1A.

FIG. 2 is an example block flow diagram of data flows and interactions between components of the host system 120 and the remote verifier 130 communicating through the network 135 in the example security verification system 100. The components of the host system 120 may include: boot instructions 104 to initiate various functionality of the host system 120; a trusted platform module 102 to allow for verification of uncompromised functionality of components of the host system 120; a hypervisor 106 which may control the initiation, continued functioning, and termination of a virtual machine 110A; an operating system 108 (e.g., Microsoft Windows, Apple OSX, Linux, etc.) controlling functionality of the host system 120 and allowing interaction with the host system 120; a virtual machine 110A which operates independently of the host system 120 allowing for isolated access to data and running applications for which the operating system 108 may not be suited, due to, for example, security constraints or a lack of functionality necessary to properly run the application.

In the example shown in FIG. 2, the host system 120 is in communication with the remote verifier via a network 135. The network 135 may be the internet, an intranet, a public or private network connecting devices within the same or different physical spaces, or a direct connection allowing communication between two devices. The network 135 may be wired or wireless and may use any communication protocol enabling communication between two devices (e.g., HTML, TCP/IP, etc.). The network 135 in this example is used to enable communication between the host system 120 and the remote verifier 130. The remote verifier 130 may be located in a different physical location than the host system 120. Alternatively, the remote verifier 130 may be in the same physical location as the host system 120 but operate on separate hardware. Alternatively, the remote verifier 130 may operate on the hardware of the host system 120 but may be logically separated from the operation of the host system 120. For example, the remote verifier 130 may be a virtual machine 110B operating on the host system 120 or may be an application running on the operating system 108 of the host system 120.

The data flow example of FIG. 2 begins with the boot instructions 104 creating an index in the trusted platform module 102. The index may be created, for example, by allocating a memory location of the non-volatile memory 154 of the trusted platform module 102. The boot instructions 104 may create the index in the trusted platform module 102 before other components of the host system 120 are initiated. The boot instructions 104 may also create the index before components outside of the platform layer 122 are initiated. The creation of the index prior to initiation of potentially compromised components of the host system 120 prevents tampering with the initial creation of the index in the trusted platform module 102. The creation of the index in the trusted platform module 102 may require use of an authorization information, such as the EK of the trusted platform module 102, or the public portion of an authorization key stored in the authorization key storage 152. The boot instructions 104 may also record the value, or attributes, of the index created in the trusted platform module 102 in an event log. The event log may be stored in a platform configuration register 156. Additionally, the boot instructions 104 may record the value or attributes of the index in the platform configuration register 156 of the trusted platform module 102.

The boot instructions 104 may additionally set authorization information of the index. The authorization information may be stored by the boot instructions 104 in the authorization key storage 152 of the trusted platform module 102. The authorization information may be required to read the index. Alternatively, the authorization information may be required to gain write access or alter information of the index. The authorization information may be determined by the boot instructions 104 and may be a value requested from the authorization key storage 152 by the boot instructions 104. Alternatively, the authorization information may be determined by the boot instructions 104 based on a value received from the trusted platform module 102.

In some examples, the authorization information may provide extend access to a memory location or a platform configuration register 156 of the trusted platform module 102. Extend access may allow a component to concatenate an additional value to a current value stored in the memory location. Extend access may not allow a component to replace the current value, alter the current value, or delete the current value stored in the memory location.

Additionally, the boot instructions 104 may assign a policy of the index. The policy assigned by the boot instructions 104 to the index determines a type, or format, of data the index is capable of storing. The policy assigned by the boot instructions 104 may, for example, define the format of data accepted by the index to match the format of the output of a cryptographic hash to be applied to data transmitted to the index by the hypervisor 106. Information stored at the index may be in a format conforming to the policy. For example, a policy of the index to accept a 512-bit value may be applied by the boot instructions 104 where the expected input to the index from the hypervisor 106 is an output of a SHA-2 hash function.

The boot instructions 104 then transmit the location of the index in the non-volatile memory 154 of the trusted platform module 102 to the hypervisor 106. The boot instructions 104 may additionally transmit the authorization information for the index to the hypervisor 106.

Alternatively, the preceding actions performed by the boot instructions 104 in this example may be performed by a privileged platform component of the host system 120, such as a hypervisor loader (not shown). The privileged platform component performing these steps may be located in the platform layer 122 or system layer 124. Alternatively, the privileged platform component may exist in a logical layer between the platform layer 122 and the system layer 124.

In this example, the hypervisor 106 then waits for the operating system 108 to initiate the boot sequence of a virtual machine 110A on the host system 120. Alternatively, another component of the host system 120 may initiate a boot sequence of the virtual machine 110A. Alternatively, a remote system (e.g., remote verifier 130) in communication with the host system 120 over the network 135 may initiate the virtual machine 110A. The virtual machine 110A may require an entry point for a bootstrap code, indicating the start point for the boot sequence of the virtual machine 110A within the bootstrap code. The boot sequence of the virtual machine 110A may be performed according to the bootstrap code. Where the virtual machine 110A requires an entry point for the bootstrap code, the initialization of the virtual machine 110A may wait for an entry point to the bootstrap code to be received by the virtual machine 110A.

When the virtual machine 110A has been initiated, the hypervisor 106 transmits the index and the authorization information of the index along with the entry point to the bootstrap code to the virtual machine 110A and may bypass the operating system 108 to maintain the security of the index location and the authorization information for the index. Alternatively, the bootstrap code may include instructions to request from the hypervisor 106 the index and authorization information, or a location in a memory of a component of the host system 120 where the index and authorization information are securely located (e.g., a hypervisor loader).

The bootstrap code may be stored in a non-volatile memory of the host system 120 and accessible by the virtual machine 110A, for example as part of the code storing the initial state of the virtual machine 110A in the host system 120. Alternatively, the hypervisor 106 may transmit to the operating system 108 an entry point for a bootstrap code to initiate the virtual machine 110A, but transmit the index location and the authorization information to the virtual machine 110A separately, bypassing the operating system 108 (e.g., in response to a request of the bootstrap code operating in the virtual machine 110A).

The bootstrap code is initiated by the hypervisor 106 or the operating system 108 and establishes a secure channel through the operating system 108 to the trusted platform module 102 for the virtual machine 110A. Alternatively, the secure channel may be established by the virtual machine 110A. The secure channel may be established using the EK of the trusted platform module 102. When a secure channel has been established by the bootstrap code, a measurement is taken of the virtual machine 110A at initiation (e.g., when the information containing the initial state of the virtual machine 110A is loaded into the non-volatile memory of the host system 120). The measurement may be generated by a processor of the host system 120 performing according to instructions stored in the non-volatile memory of the host system 120, for example the bootstrap code. The output of the measurement of the virtual machine 110A may be a cryptographic digest of the contents of the non-volatile memory of the host system 120 storing the initial state of the virtual machine 110A. The output of the measurement may be in the format of the policy assigned to the index previously by the boot instructions 104. Alternatively, the policy of the index may be assigned by the boot instructions 104 based on the expected output of the measurement by the bootstrap code, where the expected output is known to the boot instructions 104. The output of the measurement is then stored in the index of the trusted platform module 102, for example by extending the index to store the measurement.

The virtual machine 110A, or the bootstrap code running on the processor of the host system 120, then creates a cryptographic key pair having a private portion and a public portion. The virtual machine 110A, bootstrap code, or the hypervisor 106 may store the public portion of the cryptographic key in the assigned index of the trusted platform module 102 or in the authorization key storage 152 of the trusted platform module 102 to be accessed by the remote verifier 130. Alternatively, a different method of communication secured by a cryptographic key may be used to establish secure communication between the remote verifier 130 and the virtual machine 110A.

Where there is a failure to establish a secure session between the trusted platform module 102 and the virtual machine 110A by the bootstrap code, the virtual machine 110A or hypervisor 106 may determine a security issue exists within the host system 120. The hypervisor 106, virtual machine 110A, or operating system 108 may then initiate a remedial action, for example terminating the virtual machine 110A. Additionally, when the hypervisor 106 determines that the virtual machine 110A has been terminated, the hypervisor may reset the contents of the assigned index to zero, or to a random state, to ensure information of the terminated virtual machine 110A is no longer available. When the assigned index is reset, the assigned index may be reused for a second virtual machine 110B. When resetting the assigned index, the hypervisor may assign a new policy and a new authorization information to the index, replacing the previous authorization information. The new authorization information may be different from the previous authorization information to prevent another component of the host system 120 from tampering with the assigned index after it is reset. The new authorization information defines an access right to the assigned index of the trusted platform module 102. Resetting the assigned index to be reused with a second virtual machine 110B ensures information about the virtual machine 110A is protected from future access and preserves the limited memory available to the trusted platform module 102.

Communication with the remote verifier 130 is then established through the operating system 108. Communication may be established based on a request from the remote verifier 130, the virtual machine 110A, or the hypervisor 106. The remote verifier 130 may also access information of the trusted platform module 102, such as the assigned index or the authorization key storage 152, to retrieve the public portion of the cryptographic key needed to communicate with the virtual machine 110A securely.

When secure communication has been established, the remote verifier 130 may request a quote from the trusted platform module 102, the quote containing information associated with the contents of the assigned index. The remote verifier 130 may also request the event log from the platform configuration register 156. Additionally, the virtual machine 110A may, in response to the request by the remote verifier 130 to the trusted platform module 102, request the trusted platform module 102 certify the assigned index, for example by signing the value of the assigned index with the AIK to generate a signed certificate. Alternatively, the operating system 108 or another component of the host system 120 may be asked to sign the value of the index. The signed value may then be transmitted by the trusted platform module 102 to the remote verifier 130.

The remote verifier 130 may use the information received from the trusted platform module 102 associated with the index created by the boot instructions 104 in the trusted platform module 102 to assess whether the virtual machine 110A has been tampered with. The determination may be made based on comparing the value of the information received from the trusted platform module 102 to an expected value.

Figure 3:
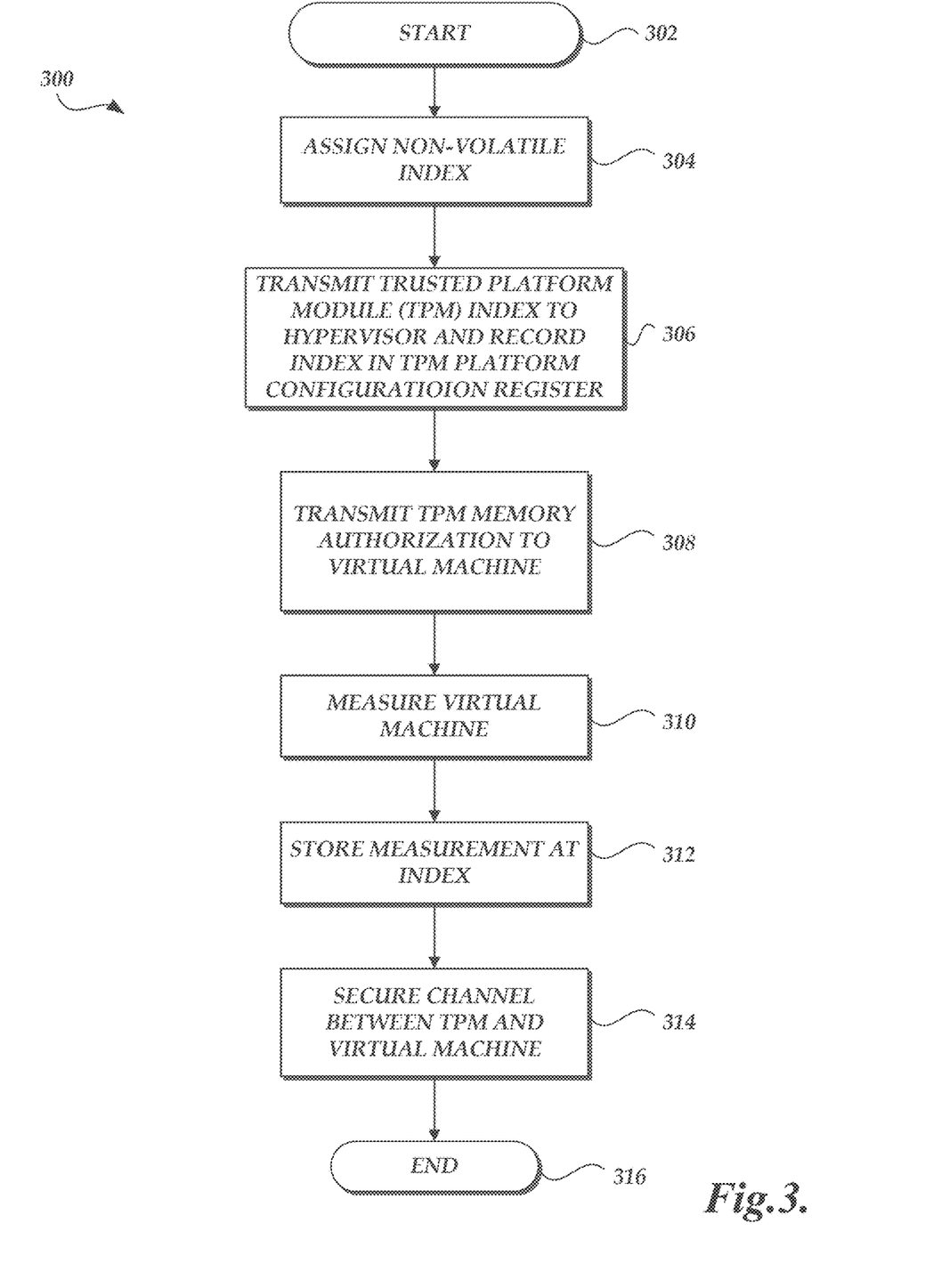
FIG. 3 is a flow diagram of an example virtual machine measurement routine implemented by a host system.

FIG. 3 is a flow diagram of an example virtual machine measurement routine or method 300 implemented, for example, by the host system 120. The routine 300 may be implemented according to the boot instructions 104 by the host system 120 having the trusted platform module 102 and the hypervisor 106. The routine 300 may alternatively be implemented by a privileged platform component of the host system 120, such as a hypervisor loader. The routine 300 starts at block 302. The routine 300 may begin in response to the powering on of the host system 120.

At block 304, the boot instructions 104 assign an index, for example a non-volatile index, of a location in the non-volatile memory 154 of the trusted platform module 102. The boot instructions 104 may, for example, assign the index of the non-volatile memory 154 of the trusted platform module 102 using platform authorization information defining an access right to store data in the trusted platform module 102. The platform authorization information may not be accessible to the operating system 108 of the host system 120. The index is used for the purpose of storing measurements of the virtual machine 110A securely so that a remote verifier 130 may access the values in the index to determine whether the virtual machine 110A has been tampered with, for example by a compromised operating system 108 of the host system 120.

Additionally, the boot instructions 104 may set authorization information, such as TPM memory authorization information, of the index. The authorization information set by the boot instructions may not be accessible to an operating system 108 of the host system 120. For example, the boot instructions 104 may generate a cryptographic key pair required to access the index. The key pair may comprise a public portion and a private portion. The public portion and the private portion of the key pair may be stored in the authorization key storage 152 of the trusted platform module 102. The boot instructions 104 may also assign a policy to the index defining the format of data accepted for storage in the index as described above.

When an index has been assigned by the boot instructions 104, the routine 300 moves to block 306. At block 306, the index is transmitted to the hypervisor 106 of the host system 120. For example, the value of the index, representing the location of the index in the non-volatile memory 154 of the trusted platform module 102 is transmitted to the hypervisor 106 of the host system 120. Additionally, where TPM memory authorization information has been generated by the boot instructions 104, the authorization information may be transmitted to the hypervisor 106.

Additionally, at block 306, the routine 300 will record, in the platform configuration register 156 of the trusted platform module 102, the location of the index in the non-volatile memory 154 of the trusted platform module 102. Storing the index location in the platform configuration register 156 allows a remote verifier 130 to securely determine the index location where a measurement of the virtual machine 110A will be stored. When the index of the trusted platform module 102 has been transmitted to the hypervisor and the index location has been recorded in the platform configuration register 156 of the trusted platform module 102, the routine 300 moves to block 308. Storing the index location in the platform configuration register 156 may include extending the value currently stored in the platform configuration register 156, such as when an event log of the platform configuration register 156 is stored therein. Extending the value may include concatenating an additional value representing the location of the index to the event log stored in the platform configuration register 156.

At block 308, the TPM memory authorization information for the index located in the non-volatile memory 154 of the trusted platform module 102 is transmitted, for example by the hypervisor 106, to the virtual machine 110A. The TPM memory authorization information defines an access right to the index of the trusted platform module 102 transmitted to the hypervisor 106 at block 306. The TPM memory authorization information may have been generated by the boot instructions 104 earlier in the routine 300. Alternatively, where the routine 300 is performed by a distinct component of the host system 120 which may be logically located in the platform layer 122, such as a privileged platform component, the TPM memory authorization information may be generated by the distinct component. Alternatively, the TPM memory authorization information may be stored in the authorization key storage 152 of the trusted platform module 102 and accessible by the virtual machine 110A or the hypervisor 106.

At block 310, a measurement of the virtual machine is generated. For example, the measurement may be the result generated from applying a cryptographic hash function to the contents of a memory location of the host system 120 containing the virtual machine 110A contents when the virtual machine 110A is initiated. The measurement may be generated based on instructions initiated by the hypervisor 106. Alternatively, the measurement may be generated by a privileged component of the host system 120, the hypervisor 106, or a processor of the host system 120 following instructions of a bootstrap code. When the measurement has been determined, the routine 300 moves to block 312.

At block 312, the measurement is stored at the index of the trusted platform module 102 using the TPM memory authorization information of the index. The measurement may be stored based on instructions initiated by the hypervisor 106. Alternatively, the measurement may be stored by the virtual machine 110A, the hypervisor 106, or the host system 120 following instructions of a bootstrap code. The TPM memory authorization information for the index of the trusted platform module 102 may be used by the hypervisor 106, or bootstrap code initiating the virtual machine 110A, to store a measurement of the virtual machine 110A in the index of the trusted platform module 102 when the virtual machine 110A is initiated. Alternatively, the TPM memory authorization information for the index may be used by the hypervisor 106 to store a measurement of the virtual machine 110A in the index of the trusted platform module 102 before the virtual machine 110A receives an entry point to the bootstrap code. When the measurement has been stored in the trusted platform module 102, the routine 300 moves to block 314.

At block 314, a channel is secured between the trusted platform module 102 and the virtual machine 110A. The secure channel may be created using the EK of the trusted platform module 102. The secure channel may be created based on instructions initiated by the hypervisor 106. Alternatively, the secure channel may be created by the hypervisor 106, the virtual machine 110A, or the host system 120 following instructions of a bootstrap code. In creating the secure channel, the remote verifier 130 may request the operating system 108 perform an operating system verification of the contents of the operating system TPM index of the trusted platform module 102 to determine a security status of the operating system 108. The host system 120 may then transmit the operating system verification result to the remote verifier 130. The operating system verification may be performed using the AIK of the trusted platform module 102 to sign an event log of the operating system index. When the channel is secured between the trusted platform module 102 and the virtual machine 110A, the routine 300 moves to block 316 and ends.

Figure 4:
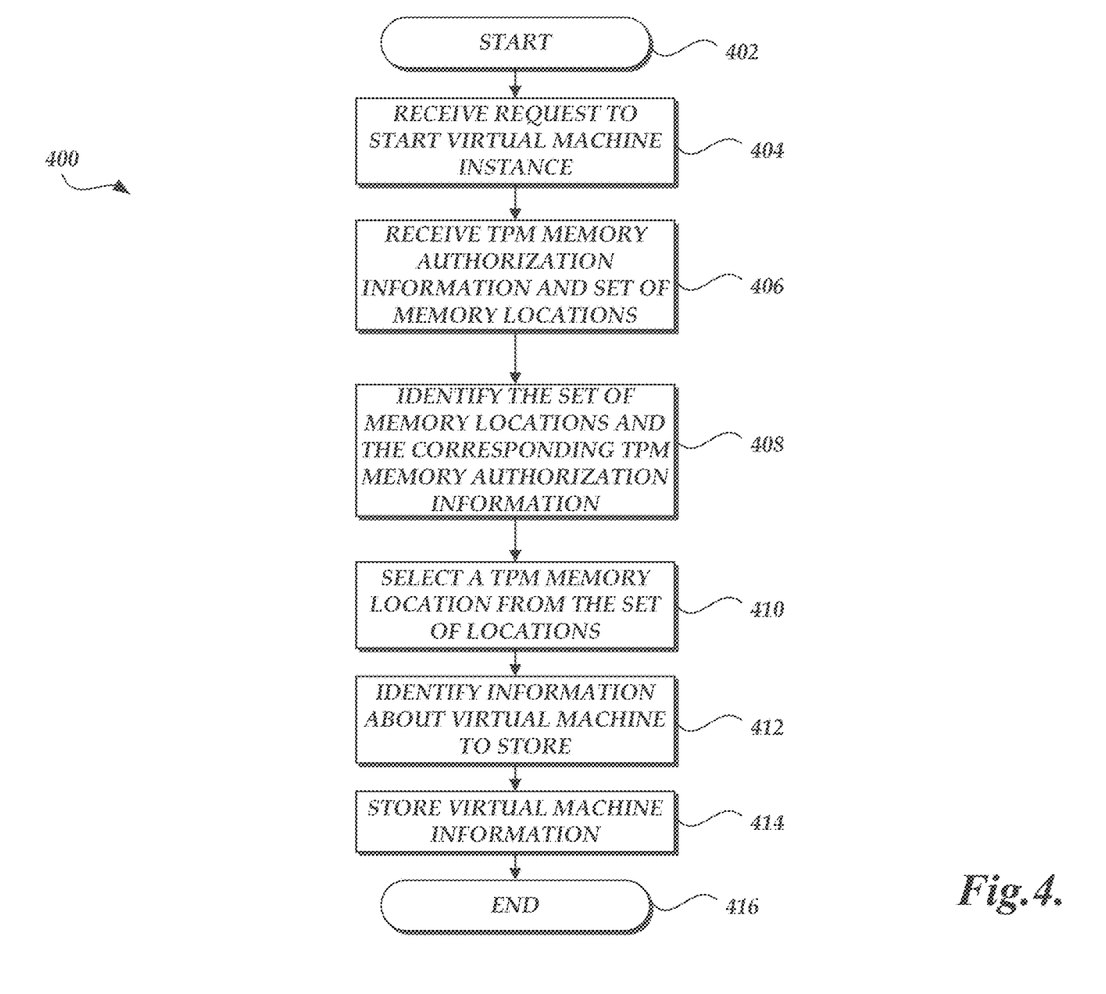
FIG. 4 is a flow diagram of another example virtual machine measurement routine implemented by a host system.

FIG. 4 is a flow diagram of another example virtual machine measurement routine or method 400 implemented, for example, by the host system 120. The routine 400 may be initiated or implemented by the hypervisor 106 of the host system 120. The routine 400 may alternatively be implemented by a privileged platform component of the host system 120, such as a hypervisor loader. The routine 400 starts at block 402. The routine 400 may begin in response to instructions from the boot instructions 104 of the host system 120.

At block 402, the hypervisor 106 receives a request to start a virtual machine instance, for example virtual machine 110A. The request may be received from the boot instructions 104 implemented by a computing device. The request may be received before the operating system 108 of the host system 120 has been initiated in order to maintain secure control of the trusted platform module 102 by the boot instructions 104 and the hypervisor 106. When the request is received, the routine 400 moves to block 406.

At block 406, the hypervisor 106 receives a set of memory locations in the non-volatile memory 154 of the trusted platform module 102. The set of memory locations may be an index. Additionally, the hypervisor 106 receives TPM memory authorization information for the set of memory locations. Alternatively, the TPM memory authorization information may be stored in the authorization key storage 152, and the hypervisor 106 may receive information necessary to access the TPM memory authorization information in the authorization key storage 152. The TPM memory authorization information may be generated using platform authorization information, the platform authorization information defining an access right to store data in the trusted platform module 102. The TPM memory authorization information may define access rights to individual memory locations of the set of memory locations. The TPM memory authorization information may be different for each memory location of the set of memory locations. When the set of memory locations and the TPM memory authorization information are received by the hypervisor 106, the routine 400 may move to block 408.

At block 408, the hypervisor 106 initiates instructions to identify the set of memory locations of the trusted platform module 102 where a measurement of the virtual machine instance may be stored. Additionally at block 408, the hypervisor 106 identifies TPM memory authorization information associated with the identified set of memory locations. Some or all of block 408 may be performed by the hypervisor 106 as part of block 406. When the hypervisor 106 has identified the set of memory locations and corresponding TPM memory authorization information, the routine 400 moves to block 410.

At block 410, the hypervisor 106 initiates instructions to select or otherwise selects a particular memory location of the set of memory locations received at block 406 and identified at block 408. The selection of a memory location by the hypervisor 106 may be random, based on a predetermined value, or the hypervisor 106 may select the first or last of the identified memory locations. When a particular memory location has been selected by the hypervisor 106, the routine 400 moves to block 412.

At block 412, the hypervisor 106 initiates instructions to identify or otherwise identifies information about the virtual machine instance, such as a measurement, to be stored in a memory location of the trusted platform module 102. The memory location may be the particular memory location selected in block 408. The information to be stored about the virtual machine 110A may be a cryptographic digest resulting from applying a cryptographic method to the contents of a storage location of the host system 120 where the virtual machine instance is stored prior to being initiated. The cryptographic method may be selected by the hypervisor 106. Alternatively, the cryptographic method may be based on a policy of the memory location in the trusted platform module 102 where the information is to be stored. The policy of the memory location of the trusted platform module 102 may have been set by the boot instructions 104, for example during a boot sequence of the host system 120. Alternatively, the cryptographic method may be based on instructions received by the host system 120 from the remote verifier 130. When the information has been identified by the hypervisor 106, the routine 400 moves to block 414.

At block 414, the information from block 412 is stored at the particular memory location of the trusted platform module 102 by the hypervisor 106. Alternatively, the storage of the information from block 412 is performed according to instructions provided by the hypervisor 106, such as by a bootstrap code where the hypervisor 106 has provided the entry point of the bootstrap code. Alternatively, the information from block 410 may be transmitted to another component of the host system 120 to be stored in the trusted platform module 102. The information may be stored using TPM memory authorization information for the memory location of the non-volatile memory 154. The TPM memory authorization information may be generated by the boot instructions 104 or stored in the authorization key storage 152 and received by the hypervisor 106. The TPM memory authorization information is used to define an access right of the memory location of the trusted platform module 102 identified at block 408 or received at block 406. When the information has been stored in the trusted platform module 102, the routine 400 moves to block 416 and ends.

Figure 5:
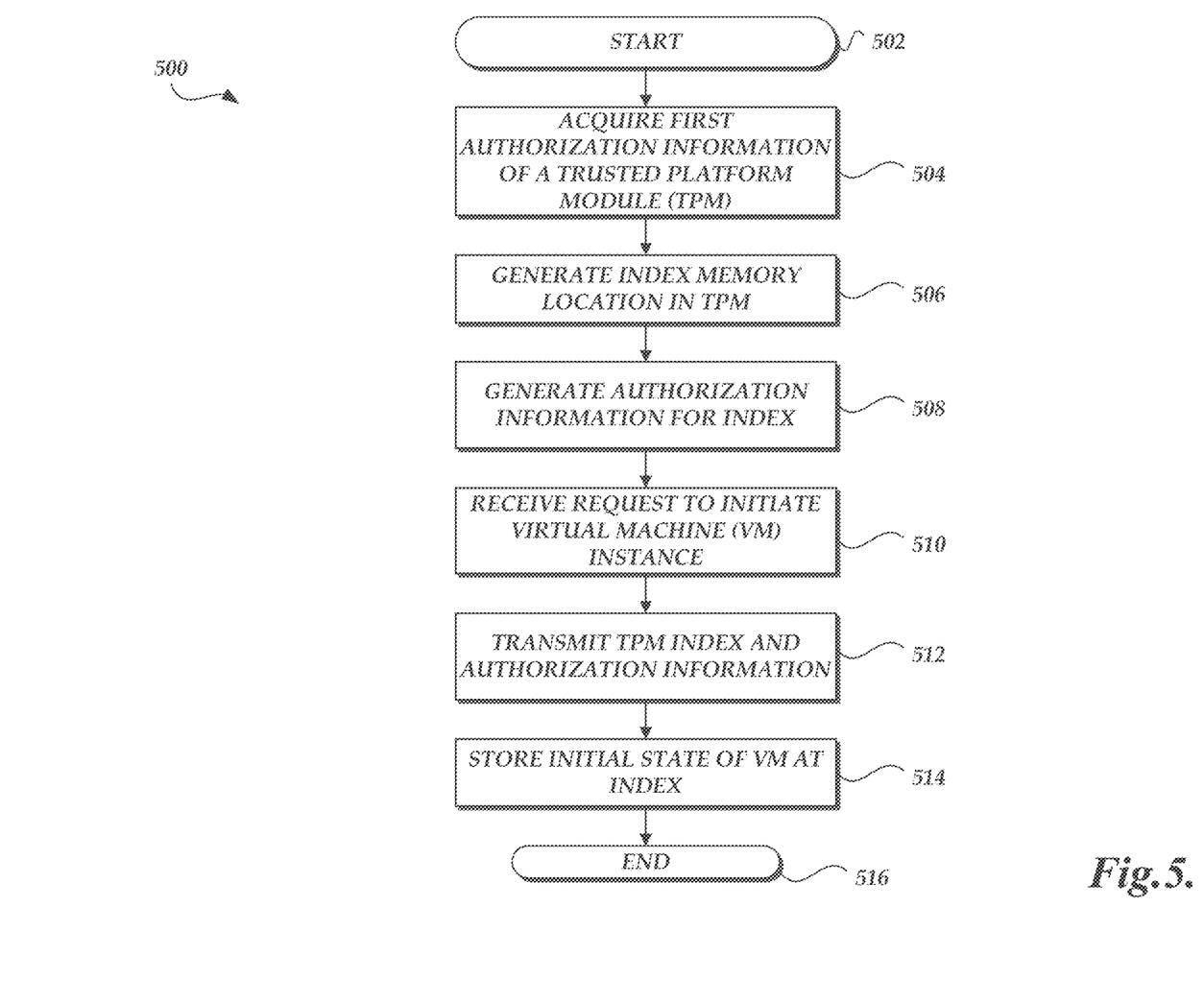
FIG. 5 is a flow diagram of yet another example virtual machine measurement routine implemented by a host system.

FIG. 5 is a flow diagram of yet another example virtual machine measurement routine or method 500 implemented, for example, by the host system 120. The routine 500 may be implemented by components of the host system 120, for example the boot instructions 104 and the hypervisor 106 in communication with the trusted platform module 102. The routine 500 starts at block 502. The routine 500 may begin during the boot sequence of the host system 120.

At block 504, the boot instructions 104 acquire first authorization information for the trusted platform module 102. Alternatively, a privileged platform component, for example a hypervisor loader, of the host system 120 may acquire the first authorization information. The first authorization information, or platform authorization information, defines access rights to store data in the trusted platform module 102. The first authorization information may be an EK of the trusted platform module 102 and may be used to allow for the assigning of an index in the non-volatile memory 154 to store a measurement of the virtual machine 110A. Additionally, the first authorization information may be used to set a policy of the index. The policy may determine the format of information accepted by the non-volatile memory 154 at the index. The policy may be based on the output size of a cryptographic method, for example the size of the output result from applying SHA-2 to an input value. When the first authorization information has been acquired by the boot instructions 104, the routine 500 moves to block 506.

At block 506, an index of an allocated memory location of the trusted platform module 102 is generated in the non-volatile memory 154 of the trusted platform module 102. The index is generated using platform authorization information of the trusted platform module 102. The index may be generated by the boot instructions 104. When the index is generated by the boot instructions 104, the routine 500 moves to block 508.

At block 508, the boot instructions 104 generate second authorization information. The second authorization information is generated for the index generated at block 506. The second authorization information, or TPM memory authorization information, may define an access or control right, or a set of access or control rights, for the index of the allocated memory location of the trusted platform module 102. The second authorization information may be generated using the first authorization information for the trusted platform module 102 acquired at block 504. The second authorization information may be a cryptographic key pair comprising a public portion and a private portion. The public portion and the private portion may be stored in the authorization key storage 152 of the trusted platform module 102. The cryptographic key pair may be generated based on a random value or a value stored in the authorization key storage 152. When TPM memory authorization information for the index has been generated by the boot instructions 104, the routine 500 moves to block 510.

At block 510, a request to initiate the virtual machine 110A is received. The request may be received by the boot instructions 104 or the hypervisor 106. The request may be received from the remote verifier 130 or the operating system 108. The request may indicate a memory location where the virtual machine 110A is stored in the non-volatile memory of the host system 120. Alternatively, the request may describe the virtual machine 110A, and the operating system 108 may provide access to the instructions to initiate the virtual machine 110A. When the request has been received by the boot instructions 104 or hypervisor 106, the routine 500 moves to block 512.

At block 512, the boot instructions 104 transmit the index generated at block 506 and the second authorization information for the index generated at block 508 to the hypervisor 106. Alternatively, the index and the second authorization information are transmitted by the boot instructions 104 or a privileged platform component of the host system 120 to a bootstrap sequence running on the host system 120 used to initiate the virtual machine 110A. When the index and the second authorization information have been transmitted to the hypervisor 106 or bootstrap sequence running on the host system 120, the routine 500 moves to block 514.

At block 514, the initial state of the virtual machine 110A is stored at the index of the trusted platform module 102 based on the second authorization information. The initial state may be stored by the hypervisor 106 or a bootstrap sequence running on the host system 120 to initiate the virtual machine 110A. The initial state may be stored as the result of a cryptographic method applied to a value of the virtual machine 110A in non-volatile memory of the host system 120. The value of the virtual machine 110A may be the entire contents of a memory location of the host system 120 where information defining the virtual machine 110A before or at initiation is stored. Alternatively, the value of the virtual machine 110A may be a portion of the contents of a memory location of the host system 120 storing the initial state of the virtual machine 110A. The cryptographic method produces a result conforming to a policy applied to the index, as discussed previously in relation to block 504. The initial state may be used by a remote verifier 130 to verify that the virtual machine 110A has not been tampered with, for example by a compromised operating system 108 of the host system 120. When the initial state has been stored, the routine 500 moves to block 516 and ends.

All of the methods and tasks described herein may be performed and fully automated by a computer system, such as the security verification system 100. The computer system may, in some cases, include one computer or processor. The computer system may, in other cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes machine-readable instructions or modules stored in a memory or other non-transitory computer-readable storage medium or device (e.g., solid state storage devices, disk drives, etc.). The various functions or routines disclosed herein may be embodied in such machine-readable instructions or may be implemented in application-specific circuitry (e.g., an application specific integrated circuit (ASIC) or a field programmable gate array (FPGA)) of the computer system. Where the computer system includes multiple computing devices, these devices may, but need not, be co-located. The results of the disclosed tasks, methods, processes, or routines may be persistently stored by transforming physical storage devices, such as solid-state memory chips or magnetic disks, into a different state. In some examples, the computer system may be a cloud-based computing system whose processing resources are shared by multiple distinct business entities or other users.

Many other variations than those described herein will be apparent from this disclosure. For example, depending on the example, certain operations, events, or functions of any of the methods, processes, or routines described herein can be performed in a different sequence, can be added, merged, or left out altogether (e.g., not all described operations or events are necessary for the practice of the routine). Moreover, in certain examples, operations, events, or functions can be performed concurrently, e.g., through multi-threaded processing, interrupt processing, or multiple processors or processor cores or on other parallel architectures, rather than sequentially. In addition, different tasks, methods, processes, or routines can be performed by different machines and/or computing systems that can function together.

The elements of a method, process, routine, or task described in connection with the examples disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or blocks. Thus, such conditional language is not generally intended to imply that features, elements and/or blocks are in any way required for any examples or that any example necessarily include logic for deciding, with or without other input or prompting, whether these features, elements and/or blocks are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "an" should generally be interpreted to include one or more described items. Accordingly, phrases such as "a device to" are intended to include one or more recited devices. Such one or more recited devices can also collectively carry out the stated recitations. For example, "a processor to carry out recitations A, B and C" can include a first processor to carry out recitation A working in conjunction with a second processor to carry out recitations B and C.

What is claimed is:

1. A non-transitory machine-readable storage medium encoded with instructions executable by a processor of a computing device, the machine-readable storage medium comprising instructions to:
   acquire first authorization information, wherein the first authorization information defines an access right to store data in a trusted platform module (TPM) of the computing device;
   generate an index of an allocated memory location of the TPM and second authorization information using the first authorization information, wherein the second authorization information defines an access right associated with the index;
   receive a request from a hypervisor to initiate a virtual machine;
   transmit the second authorization information to the hypervisor; and
   store an initial state of the virtual machine at the index using the second authorization information.

2. The non-transitory machine-readable storage medium of claim 1, wherein the first authorization information comprises platform hierarchy authorization information not accessible to an operating system of the computing device.

3. The non-transitory machine-readable storage medium of claim 1, wherein the second authorization information comprises an authorization information of the index accessible to the hypervisor and the virtual machine, and not accessible to an operating system of the computing device.

4. The non-transitory machine-readable storage medium of claim 1 further comprising instructions to record index attributes to a TPM event log.

5. The non-transitory machine-readable storage medium of claim 1 further comprising instructions to record index attributes to a TPM platform configuration register.

6. The non-transitory machine-readable storage medium of claim 1 further comprising instructions to set a policy of the index, wherein the policy determines a hash format accepted by the index.

7. A non-transitory machine-readable storage medium encoded with instructions executable by a processor of a computing device, the machine-readable storage medium comprising instructions to:
   receive a request to instantiate a virtual machine instance;
   receive, from boot instructions of a computing device, a set of memory locations of a trusted platform module (TPM) and TPM memory authorization information for the set of memory locations, wherein the TPM memory authorization information is created using platform authorization information, wherein the TPM memory authorization information defines access rights to individual memory locations of the set of memory locations, and wherein the platform authorization information defines an access right to store data in the TPM; and
   initiate via a hypervisor to:
      identify the set of memory locations and the TPM memory authorization information,
      select a particular memory location of the set of memory locations,
      identify information describing the virtual machine instance to be stored, and
      store the information at the particular memory location using the TPM memory authorization information to gain extend access to the particular memory location.

8. The non-transitory machine-readable storage medium of claim 7 further comprising instructions to:
   select a second particular memory location of the set of memory locations;
   identify second information describing a second virtual machine instance to be stored; and
   store the second information at the second particular memory location using the TPM memory authorization information to gain extend access to the second particular memory location.

9. The non-transitory machine-readable storage medium of claim 7 further comprising instructions to receive a policy of the set of memory locations, wherein the policy defining a hash format accepted by the set of memory locations, and wherein the information at the particular memory location is in a format conforming to the policy.

10. The non-transitory machine-readable storage medium of claim 7, wherein the boot instructions are stored on a privileged platform component of the computing device.

11. A non-transitory machine-readable storage medium encoded with instructions executable by a processor of a computing device having a trusted platform module (TPM) and a hypervisor, the machine-readable storage medium comprising instructions to:
   assign an index of a non-volatile memory location of a trusted platform module (TPM) using platform authorization information, wherein the platform authorization information defines an access right to store data in the TPM;

transmit the index and TPM memory authorization information to the hypervisor, wherein the TPM memory authorization information defines an access right to the index;

transmit, by the hypervisor, the TPM memory authorization information of the index to a virtual machine; and initiate, by the hypervisor, instructions to:
generate a measurement of the virtual machine, the measurement comprising a cryptographic digest,
store the measurement at the index using the TPM memory authorization information, and
secure a channel to the TPM for the virtual machine using an authorization information.

12. The non-transitory machine-readable storage medium of claim 11 further comprising instructions to set a policy of the index, wherein the policy determines a hash format accepted by the index.

13. The non-transitory machine-readable storage medium of claim 11 further comprising instructions to receive, from the virtual machine, a request to certify the index, wherein certifying the index comprises cryptographically signing an event log of the index.

14. The non-transitory machine-readable storage medium of claim 11 further comprising instructions to:
determine the virtual machine has been terminated;
reset the contents of the index to zero; and
generate new TPM memory authorization information, wherein the new TPM memory authorization information defines an access right to the index, and wherein the new TPM memory authorization information replaces the TPM memory authorization information.

15. The non-transitory machine-readable storage medium of claim 11 further comprising instructions to receive, from a second computing device, a request to verify the virtual machine.

16. The non-transitory machine-readable storage medium of claim 15, wherein the request to verify the virtual machine comprises a request for a hash of the contents of the TPM.

17. The non-transitory machine-readable storage medium of claim 15 further comprising instructions to request from the computing device an event log; and transmit the event log to the second computing device.

18. The non-transitory machine-readable storage medium of claim 17 wherein the event log is a platform configuration register event log.

19. The non-transitory machine-readable storage medium of claim 11 further comprising instructions to request, from a platform configuration register of the TPM, a cryptographic digest associated with the hypervisor allowing a second computing device to verify the hypervisor has been loaded; and transmit the cryptographic digest to the second computing device.

20. The non-transitory machine-readable storage medium of claim 19, further comprising instructions to request, from a second platform configuration register of the TPM, the non-volatile memory location.

* * * * *